US009423648B2

(12) United States Patent
Wang et al.

(10) Patent No.: US 9,423,648 B2
(45) Date of Patent: Aug. 23, 2016

(54) TRANSFLECTIVE DISPLAY PANEL, METHOD FOR FABRICATING THE SAME AND DISPLAY DEVICE

(71) Applicant: BOE TECHNOLOGY GROUP CO., LTD., Beijing (CN)

(72) Inventors: Xinxing Wang, Beijing (CN); Jaegeon You, Beijing (CN); Jikai Yao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 95 days.

(21) Appl. No.: 14/347,317

(22) PCT Filed: Dec. 10, 2013

(86) PCT No.: PCT/CN2013/088989
§ 371 (c)(1),
(2) Date: Mar. 26, 2014

(87) PCT Pub. No.: WO2014/206018
PCT Pub. Date: Dec. 31, 2014

(65) Prior Publication Data
US 2015/0177565 A1 Jun. 25, 2015

(30) Foreign Application Priority Data
Jun. 27, 2013 (CN) .......................... 2013 1 0263627

(51) Int. Cl.
G02F 1/1335 (2006.01)

(52) U.S. Cl.
CPC .... *G02F 1/133555* (2013.01); *G02F 1/133504* (2013.01); *G02F 1/133514* (2013.01); *G02F 2001/133565* (2013.01); *G02F 2202/36* (2013.01); *G02F 2203/03* (2013.01)

(58) Field of Classification Search
CPC .................................................. G02F 1/133504
See application file for complete search history.

(56) References Cited

U.S. PATENT DOCUMENTS 6,327,088 B1 12/2001 Iwata et al.
6,847,426 B2 1/2005 Fujimori et al.
(Continued)

FOREIGN PATENT DOCUMENTS

CN 1410815 A 4/2003
CN 1646972 A 7/2005
(Continued)

OTHER PUBLICATIONS

English Translation of the International Search Report of PCT/CN2013/088989 published in English on Dec. 31, 2014.
(Continued)

Primary Examiner — Wen-Ying P Chen
(74) Attorney, Agent, or Firm — Collard & Roe, P.C.

(57) ABSTRACT

A transflective display panel, a method for fabricating the same and a display device are provided. The transflective display panel comprises an array substrate and a color film substrate cell-assembled with each other and a liquid crystal layer sandwiched between the array substrate and the color film substrate. A plurality of pixel units correspondingly formed on the array substrate and the color film substrate. Each pixel unit comprises a reflective region and a transmissive region. Disposed inside the reflective region are a first reflection layer disposed on the side of the array substrate that is close to the liquid crystal layer and a diffuse reflection layer disposed on the side of the color film substrate that is close to the liquid crystal layer. The diffuse reflection layer and the first reflection layer are disposed opposite each other.

10 Claims, 2 Drawing Sheets

(56) References Cited

U.S. PATENT DOCUMENTS

| | | | |
|---|---|---|---|
| 6,894,745 | B2 | 5/2005 | Fujimori et al. |
| 7,440,053 | B2 | 10/2008 | Hamawaki |
| 2001/0008437 | A1* | 7/2001 | Fujimori ........... G02F 1/133555 349/113 |
| 2002/0036730 | A1 | 3/2002 | Baek et al. |
| 2008/0030860 | A1* | 2/2008 | Chang ................. G02B 5/0215 359/599 |

FOREIGN PATENT DOCUMENTS

| | | |
|---|---|---|
| CN | 101840103 A | 9/2010 |
| CN | 103293759 A | 9/2013 |
| JP | 2003262857 A | 9/2003 |
| TW | 1286641 B | 9/2007 |

OTHER PUBLICATIONS

Chinese Office Action of Chinese Application No. 201310263627.1, mailed Mar. 17, 2015 with English translation.

International Search Report, International Preliminary Report on Patentability and Written Opinion of the International Searching Authority of PCT/CN2013/088989 in Chinese, mailed Apr. 3, 2014.

Second Chinese Office Action of Chinese Application No. 201310263627.1, mailed Jul. 9, 2015 with English translation.

Third Chinese Office Action of Chinese Application No. 201310263627.1, mailed Nov. 25, 2015 with English translation.

English translation of the International Preliminary Report on Patentability and Written Opinion of the International Searching Authority of PCT/CN2013/088989, issued Dec. 29, 2015.

Fourth Chinese Office Action of Chinese Application No. 201310263627.1, mailed May 24, 2016 with English translation.

* cited by examiner

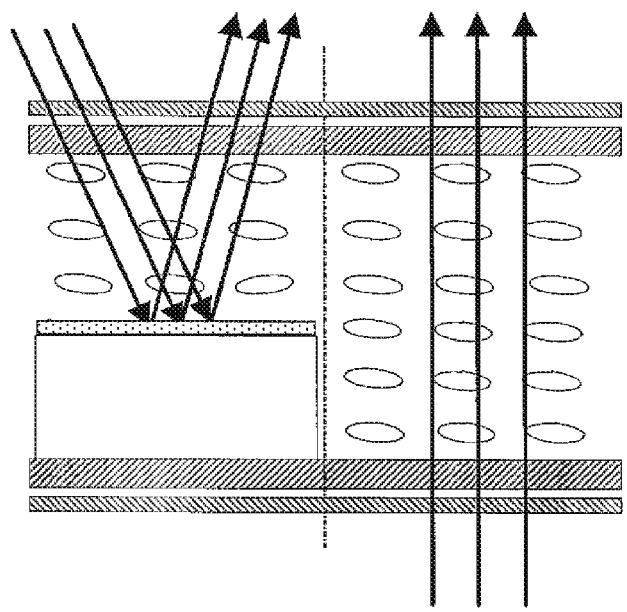
PRIOR ART Figure 1
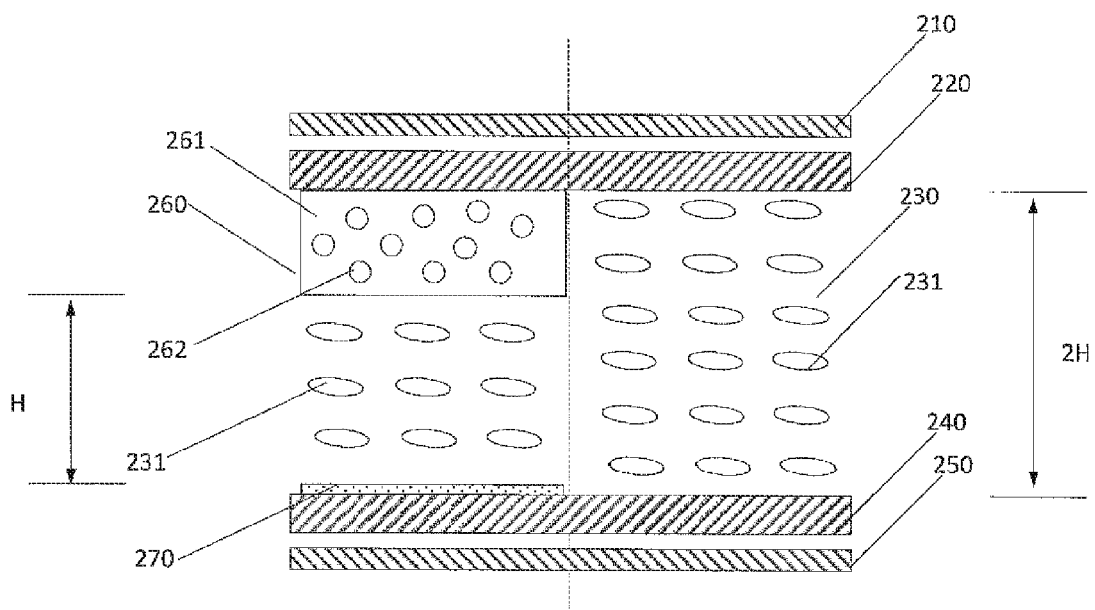
Figure 2

TRANSFLECTIVE DISPLAY PANEL, METHOD FOR FABRICATING THE SAME AND DISPLAY DEVICE

CROSS REFERENCE TO RELATED APPLICATIONS

This application is the National Stage of PCT/CN2013/088989 filed on Dec. 10, 2013, which claims priority under 35 U.S.C. §119 of Chinese Application No. 201310263627.1 filed on Jun. 27, 2013, the disclosure of which is incorporated by reference. The international application under PCT article 21(2) was not published in English.

FIELD OF THE ART

Embodiments of the invention relate to a transflective display panel, a method for fabricating the same and a display device.

BACKGROUND

A transmissive mode display has excellent readability under a dim or a dark environment, while has a poor readability under outdoor sunlight due to low brightness of the backlight. However, simply increasing the brightness of the backlight will cause the power level to decrease rapidly, while the improvement of the display effect is hardly satisfactory. A transflective liquid crystal display (LCD) may display images in transmissive mode alone or in combination with reflective mode, making it possible to use under any ambient light.

An existing transflective liquid crystal panel is shown in FIG. 1, in which on the left side of the dotted line is the reflective region of the transflective liquid crystal panel and on the right side of the dotted line is the transmissive region. A reflection plate and a pad layer are disposed under the liquid crystal layer of the reflection region. As shown in FIG. 1, specular reflection as indicated by the arrows in the reflective region will occur as the surface of the reflection plate is a reflection layer made of a layer of aluminum. It is found through simulation for such a transflective liquid crystal panel that a user can view the displayed content clearly when the angle between the viewing direction of the user and the normal direction of the display screen is within the range of ±30°, in which case the equivalent transmissivity of the light transmitted from the display screen is larger than 30%. When the angle between the viewing direction of the user and the normal direction of the display screen is larger than 30° or smaller than −30°, the equivalent transmissivity of the light transmitted from the display screen is less than 30%; as a result the user can not view the displayed content clearly. Therefore, the conventional transflective liquid crystal panel has a viewing angle too narrow to realize a wide viewing angle display.

SUMMARY

An embodiment of the invention provides a transflective display panel comprising an array substrate and a color film substrate cell-assembled with each other and a liquid crystal layer sandwiched between the array substrate and the color film substrate, a plurality of pixel units are formed on the array substrate and the color film substrate correspondingly, each pixel unit comprises a reflective region and a transmissive region, disposed inside the reflective region are a first reflection layer disposed on the side of the array substrate that is close to the liquid crystal layer and a diffuse reflection layer disposed on a side of the color film substrate that is close to the liquid crystal layer, the diffuse reflection layer and the first reflection layer disposed to be opposite to each other.

In an example, the projection of the diffuse reflection layer on the array substrate covers the whole first reflection layer.

In an example, the diffuse reflection layer comprises a base and nano-particles dispersed in the base.

In an example, the base is a resin, and the nano-particles are nano titanium dioxide particles.

In an example, the nano-particles are dispersed in the base by using a surfactant, a weight percent of the nano-particles in the base is 4-19%.

In an example, the resin is a resin having a transmissivity larger than 96%.

In an example, the resin is polyinethylmethacrylate (PMMA), polyethylene terephthalate (PET) or polycarbonate (PC).

In an example, the surface of the first reflection layer that contacts the liquid crystal layer is a smooth surface.

In an example, the surface of the diffuse reflection layer that contacts the liquid crystal layer is a smooth surface.

Another embodiment of the invention provides a display device comprising any one of the above transflective display panels.

Still another embodiment of the invention provides a method for fabricating a transflective display panel, comprising:

forming a first reflection layer in a reflection region of a pixel unit on an array substrate;

forming a diffuse reflection layer in a reflection region of a corresponding pixel unit on a color film substrate;

cell-assembling the array substrate having the first reflection layer formed thereon and the color film substrate having the diffuse reflection layer formed thereon and then injecting liquid crystal molecules, the diffuse reflection layer and the first reflection layer disposed opposite each other.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

FIG. 1 schematically illustrates a configuration of an existing transflective display panel;

FIG. 2 schematically illustrates a configuration of a pixel unit in a transflective display panel in accordance with a first embodiment of the invention.

DETAILED DESCRIPTION

Figure 3:
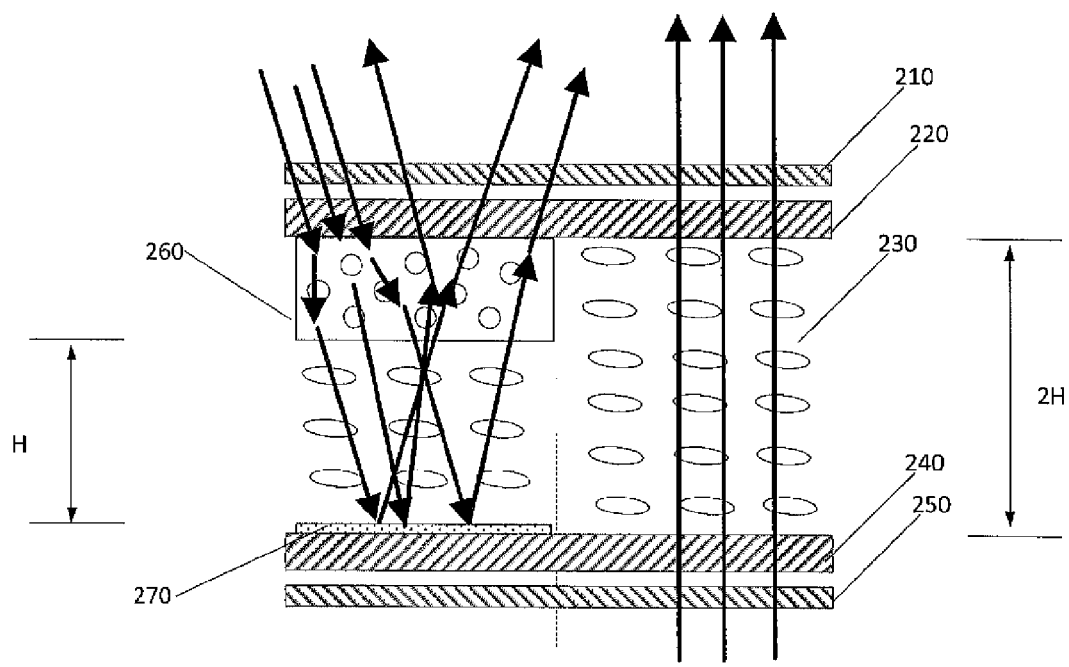
FIG. 3 is a diagram showing light paths in a pixel unit in the transflective display panel in accordance with the first embodiment of the invention.

Hereinafter, the technical solutions of the embodiment will be described in a clearly and fully understandable way in connection with the drawings. It is obvious that the described embodiments are just a part but not all of the embodiments of the invention. Based on the described embodiments herein, those skilled in the art can obtain other embodiment(s), without any inventive work, which should be within the scope of the invention.

A technical problem to be solved by embodiments of the invention is to provide a transflective display panel, a method for fabricating the same and a display device so as to realize wide viewing angle display.

First Embodiment

The first embodiment of the invention provides a transflective display panel. The transflective display panel provided by the first embodiment of the invention comprises a TFT array substrate, an opposed substrate and a liquid crystal layer sandwiched between the TFT array substrate and the opposed substrate. The opposed substrate is for example a color film substrate. A pixel electrode of each pixel unit of the TFT array substrate is adapted for applying an electric filed to control the rotation of the liquid crystal material so as to display images. The array substrate comprises a plurality of gate lines and a plurality of data lines, the plurality of gate lines and data lines are intersect with each other so as to define pixel units in matrix arrangement. Each pixel unit comprises a TFT functioning as a switch element and a pixel electrode for controlling the arrangement of the liquid crystals. The gate electrode of the TFT of each pixel unit is electrically connected to or integrally formed with the corresponding gate line; the source electrode is electrically connected to or integrally formed with the corresponding data line; and the drain electrode is electrically connected to or integrally formed with the corresponding pixel electrode. The following description is generally directed to one or more pixel units and other pixel units may be formed in a similar way.

As illustrated in FIG. 2, the transflective display panel in a pixel unit comprises a reflective region (corresponding to the region on the left side of the dotted line in FIG. 2) and a transmissive region (corresponding to the region on the right side of the dotted line in FIG. 2).

The following components are disposed in both the reflective region and the transmissive region: an upper polarizer 210, a color film substrate 220, a liquid crystal layer 230, an array substrate 240 and a lower polarizer 250. The liquid crystal layer 230 is disposed between the color film substrate 220 and the array substrate 240; the upper polarizer 210 is disposed on the side of the color film substrate 220 facing away from the liquid crystal layer 230, and the lower polarizer 250 is disposed on the side of the array substrate 240 facing away from the liquid crystal layer 230.

Further disposed inside the reflective region are a first reflection layer 270 disposed on the side of the array substrate 240 close to the liquid crystal layer 230 and a diffuse reflection layer 260 disposed on the side of the color film substrate 220 close to the liquid crystal layer 230. The diffuse reflection layer 260 and the first reflection layer 270 are disposed opposite each other. As an example, a projection of the diffuse reflection layer 260 on the array substrate 240 covers the whole first reflection layer 270.

For example, the diffuse reflection layer 260 comprises a base 261 and nano-particles 262 dispersed in the base 261.

The base 261 is for example made of a material with a transmissivity of more than 96%. In the embodiment, it can be a resin with a transmissivity of more than 96%, such as polymethylmethacrylate (PMMA), polyethylene terephthalate (PET) or polycarbonate (PC).

The nano-particles 262 may be nano metal oxide particles, such as nano aluminum oxide particles, nano zinc oxide particles, nano titanium dioxide particles and the like. In the embodiment, for example, nano titanium dioxide particles with a whiteness of more than 98% can be adopted. Such nano titanium dioxide particles hardly absorb any incident white light and therefore is beneficial for diffuse reflection of light, without reducing the brightness of the display panel.

In an example, the nano titanium dioxide particles are dispersed in the base 261 by using a surfactant, such that the nano titanium dioxide particles are dispersed more uniformly. Optionally, the weight percent of the nano titanium dioxide particles in the resin is 4-19%, the weight percent of the base resin is 80-95%, and that of the surfactant is 1-3%. The above components of the diffuse reflection layer 260 is exemplary only and not limitative to the components of the diffuse reflection layer 260 of other embodiments of the invention.

In an example, the surface of the diffuse reflection layer 260 contacting the liquid crystal layer 230 is a smooth surface, such that the arrangement of the liquid crystals in the liquid crystal layer 230 in the reflective region is not disturbed, making the liquid crystals in the liquid crystal layer 230 evenly arranged and horizontally aligned so as to guarantee the display effect.

The first reflection layer 270 is for example a specular reflection layer made of a material such as aluminum or silver and the like, so as to achieve specular reflection of light incident on the first reflection layer 270. Moreover, the surface of the first reflection layer 270 contacting the liquid crystal layer 260 is a smooth surface, such that the arrangement of the liquid crystals in the liquid crystal layer 230 in the reflective region is not disturbed, making the liquid crystals in the liquid crystal layer 230 evenly arranged and horizontally aligned so as to guarantee the display effect.

In an example, the surface of the diffuse reflection layer 260 and the surface of the first reflection layer 270 which face each other has a space H therebetween, while in the transmissive region, the surface of the array substrate 240 and the surface of the color film substrate 220 which face each other has a space 2H therebetween. That is, the thickness of the liquid crystal layer 230 between the surface of the diffuse reflection layer 260 and the surface of the first reflection layer 270 which face each other in the reflection region is half that of the liquid crystal layer 230 between the surface of the array substrate 240 and the surface of the color film substrate 220 which face each other in the transmissive region.

FIG. 3 is a diagram showing light paths which may be formed in the transflective display panel in accordance with the first embodiment of the invention. As shown in FIG. 3, in the transmissive region (on the right side of the dotted line in FIG. 3), light rays incident from the lower polarizer 250 pass through the array substrate 240, the liquid crystal layer 230, the color film substrate 220 and the upper polarizer 210 and then exit. In the reflective region (on the left side of the dotted line in FIG. 3), light rays incident from the upper polarizer 210 enter the diffuse reflection layer 260 via the color film substrate 220, and after a first diffuse reflection, part of the light rays penetrates the liquid crystal layer 230 and reaches the first reflection layer 270. The light rays incident on the first reflection layer 270 are specular reflected to pass through the liquid crystal layer 230 and enter the diffuse reflection layer 260 again. The light rays again entering the diffuse reflection layer 260 are diffuse reflected by the diffuse reflection layer 260 for a second time and exit after passing through the color film substrate 220 and the upper polarizer 210. Furthermore, light in the reflective region can also be reflected by the diffuse reflection layer 260 and the first reflection layer 270 for multiple times with light paths similar to that described above, and the related description is not repeated herein.

In the above light paths, the diffuse reflection layer 260 in the reflective region reflects the incoming light at least twice, making the light exiting the reflective region have varied exit angles. It is shown by simulation test for the transflective display panel of the embodiment that a user can view the displayed content clearly when the angle between the viewing direction of the user and the normal direction of the display screen is within the range of ±60°, in which case the equivalent transmissivity of the light transmitted from the display screen is larger than 30%. In comparison with the existing technology in which the user can clearly view the displayed content only when the angle between the viewing direction of the user and the normal direction of the display screen is within the range of ±30°, the transflective display panel of the embodiment significantly increases the viewing angle, realizing wide viewing angle display.

Furthermore, as the thickness of the liquid crystal layer 230 between the surface of the diffuse reflection layer 260 and the surface of the first reflection layer 270 which face each other in the reflection region is half that of the liquid crystal layer 230 between the surface of the array substrate 240 and the surface of the color film substrate 220 which face each other in the transmissive region, the phase difference of the light incident into the reflective region and then reflected out of the reflective region is the same as that of the light transmitted from the transmissive region, which helps to improve the display effect.

Second Embodiment

The second embodiment of the invention provides a method for fabricating the transflective display panel. The method comprises:

Step 410: forming a first reflection layer in a part of region of an array substrate.

As an example, the part of region of the array substrate corresponds to the reflection region of a pixel unit of the transflective display panel. The first reflection layer is generally made of silver or aluminum and may be formed on the part of region of the array substrate by way of sputtering, photolithography and the like.

Step 420: forming a diffuse reflection layer in a part of region of a color film substrate.

As an example, the part of region of the color film substrate also corresponds to the reflection region of the pixel unit of the transflective display panel. The diffuse reflection layer may be made of a resin material having nano-particles dispersed therein, and may be formed on the part of region of the color film substrate by way of coating, photolithography and the like.

Step 430: cell-assembling the array substrate having the first reflection layer formed thereon and the color film substrate having the diffuse reflection layer formed thereon and then injecting liquid crystal molecules. The diffuse reflection layer has a first surface that directly contacts the liquid crystal molecules, and the first reflection layer has a second surface that directly contacts the liquid crystal molecules. The first surface and the second surface are disposed to face each other.

In an example, the projection of the diffuse reflection layer on the array substrate covers the whole first reflection layer.

Third Embodiment

The embodiment provides a display device which comprises the transflective display panel of the first embodiment. In an example, the display device further comprises a backlight module. The display device may be a liquid crystal television, a notebook, a tablet PC, a smart phone and the like.

In the transflective display panel, the method for fabricating the same and the display device provided by the embodiments of the invention, the reflective region comprises the first reflection layer disposed on the side of the array substrate that is close to the liquid crystal layer and the diffuse reflection layer disposed on the side of the color film substrate that is close to the liquid crystal layer, the diffuse reflection layer and the first reflection layer are disposed opposite each other. It can thus make light exiting the reflective region have varied exit angles, which significantly increases the viewing angle of the transflective display panel and of the display device, thereby realizing wide viewing angle display.

In the transflective display panel, the method for fabricating the same and the display device provided by the embodiments of the invention, the reflective region of the pixel unit comprises the first reflection layer disposed on the side of the array substrate that is close to the liquid crystal layer and the diffuse reflection layer disposed on the side of the color film substrate that is close to the liquid crystal layer; the diffuse reflection layer and the first reflection layer has surfaces which directly contact the liquid crystal layer and are disposed to face each other. It can thus make the light exiting the reflective region have varied exit angles, which significantly increases the viewing angle of the transflective display panel and of the display device, thereby realizing wide viewing angle display. Moreover, the surface of the first reflection layer and that of the diffuse reflection layer that contact the liquid crystal layer are smooth surfaces, which helps to make the liquid crystals in the liquid crystal layer evenly arranged and horizontally aligned so as to guarantee the display effect.

Although the present invention has been described in considerable detail with reference to specific embodiments thereof, some modifications or improvements may still be made on the basis of the present invention, which is evident to those skilled in the art. Therefore, those modifications or improvements, which are made without departing from the spirit of the present invention, all belong to the protection scope of the present invention.

What is claimed is:

1. A transflective display panel comprising an array substrate and a color film substrate cell-assembled with each other and a liquid crystal layer sandwiched between the array substrate and the color film substrate, a plurality of pixel units are formed on the array substrate and the color film substrate correspondingly, each pixel unit comprises a reflective region and a transmissive region, disposed inside the reflective region are a first reflection layer disposed on the side of the array substrate that is close to the liquid crystal layer and a diffuse reflection layer disposed on a side of the color film substrate that is close to the liquid crystal layer, the diffuse reflection layer and the first reflection layer disposed to be opposite to each other, wherein the diffuse reflection layer comprises a base and nano-particles dispersed in the base, the base is a resin, the nano-particles are nano titanium dioxide particles, the diffuse reflection layer further comprises a surfactant for dispersing the nano-particles, a weight percent of the nano-particles in the base is 4-19%, a weight percent of the surfactant in the base is 1-3%.

2. The transflective display panel of claim 1, wherein the projection of the diffuse reflection layer on the array substrate covers the whole first reflection layer.

3. The transflective display panel of claim 1, wherein the resin is a resin having a transmissivity larger than 96%.

4. The transflective display panel of claim 3, wherein the resin is polyethylene terephthalate (PET).

5. The transflective display panel of claim 1, wherein the surface of the first reflection layer that contacts the liquid crystal layer is a smooth surface.

6. The transflective display panel of claim 1, wherein the surface of the diffuse reflection layer that contacts the liquid crystal layer is a smooth surface.

7. A display device comprising the transflective display panel of claim 1.

8. The transflective display panel of claim 1, wherein the resin is a resin having a transmissivity larger than 96%.

9. The transflective display panel of claim 1, wherein the resin is a resin having a transmissivity larger than 96%.

10. A method for fabricating a transflective display panel, comprising:

forming a first reflection layer in a reflection region of a pixel unit on an array substrate;

forming a diffuse reflection layer in a reflection region of a corresponding pixel unit on a color film substrate;

cell-assembling the array substrate having the first reflection layer formed thereon and the color film substrate having the diffuse reflection layer formed thereon and then injecting liquid crystal molecules, the diffuse reflection layer and the first reflection layer disposed opposite each other, wherein the diffuse reflection layer comprises a base and nano-particles dispersed in the base, the base is a resin, the nano-particles are nano titanium dioxide particles, the diffuse reflection layer further comprises a surfactant for dispersing the nano-particles, a weight percent of the nano-particles in the base is 4-19%, a weight percent of the surfactant in the base is 1-3%.

* * * * *